United States Patent
Oh

(10) Patent No.: US 10,820,710 B2
(45) Date of Patent: Nov. 3, 2020

(54) BEDHEAD FRAME AND BED FRAME STRUCTURE HAVING THE BEDHEAD FRAME

(71) Applicant: Grantec (Xiamen) Co., Ltd., Xiamen (CN)

(72) Inventor: Suk Kan Oh, Xiamen (CN)

(73) Assignee: GRANTEC (XIAMEN) CO., LTD., Xiamen, Fujian (CN)

( * ) Notice: Subject to any disclaimer, the term of this patent is extended or adjusted under 35 U.S.C. 154(b) by 274 days.

(21) Appl. No.: 15/697,453

(22) Filed: Sep. 7, 2017

(65) Prior Publication Data

US 2018/0084920 A1   Mar. 29, 2018

(30) Foreign Application Priority Data

Sep. 23, 2016 (CN) .................... 2016 2 1072633 U

(51) Int. Cl.
```
A47C 19/02      (2006.01)
F16B 12/56      (2006.01)
F16B 12/54      (2006.01)
F16B 12/52      (2006.01)
A47C 19/00      (2006.01)
A47C 19/20      (2006.01)
```
(Continued)

(52) U.S. Cl.
CPC ............ *A47C 19/022* (2013.01); *F16B 12/56* (2013.01); *A47C 19/005* (2013.01); *A47C 19/02* (2013.01); *A47C 19/04* (2013.01); *A47C 19/20* (2013.01); *A47C 31/00* (2013.01); *F16B 12/52* (2013.01); *F16B 12/54* (2013.01)

(58) Field of Classification Search
CPC ..... A47C 19/022; A47C 31/00; A47C 19/021; A47C 19/024; A47C 19/025; A47C 19/00; A47C 19/028; A47C 19/02; A47C 19/04; A47C 19/045; A47C 19/20; A47C 19/202; A47C 19/005; F16B 12/56; F16B 12/52; F16B 12/54; F16B 12/02; F16B 12/22; F16B 12/26; F16B 12/12; F16B 12/46; A61G 7/0506
See application file for complete search history.

(56) References Cited

U.S. PATENT DOCUMENTS

| 177,771 A | * | 5/1876 | Tottingham | ............ | A47C 17/68 |
| | | | | | 5/114 |
| 858,475 A | * | 7/1907 | Scanlan | ................. | A47C 17/68 |
| | | | | | 5/114 |

(Continued)

*Primary Examiner* — Nicholas F Polito
*Assistant Examiner* — Morgan J McClure
(74) *Attorney, Agent, or Firm* — Leong C. Lei

(57) ABSTRACT

A bedhead frame and a bed frame structure having the bedhead frame are provided. The bedhead frame includes two vertical rods arranged symmetrically and at least one horizontal rod connected between the two vertical rods. Each of the vertical rods is an L-shaped structure. The horizontal rod and the vertical rods of the bedhead frame are detachable, which can be transported or stored conveniently. In particular, the vertical rods of the bedhead frame employ an L-shaped structure. When a mattress is installed to the bed frame structure having the bedhead frame, both sides of the mattress are just between upright sides and horizontal sides of the two vertical rods, thereby preventing the mattress from shifting.

11 Claims, 7 Drawing Sheets

(51) Int. Cl.
*A47C 19/04* (2006.01)
*A47C 31/00* (2006.01)

(56) References Cited

U.S. PATENT DOCUMENTS

| | | | | |
|---|---|---|---|---|
| 1,781,807 A * | 11/1930 | De Leon | A47C 19/025 | 5/8 |
| 2,376,347 A * | 5/1945 | Dewey | A47C 19/022 | 5/280 |
| 2,541,194 A * | 2/1951 | Bornhuetter | A47C 19/005 | 5/131 |
| 2,567,619 A * | 9/1951 | Rosenfeld | A47C 19/024 | 5/181 |
| 2,582,832 A * | 1/1952 | Hopkins | A47C 19/021 | 5/131 |
| 2,704,371 A * | 3/1955 | Liphart | A47C 19/021 | 5/513 |
| 2,721,338 A * | 10/1955 | Resnick | A47C 19/005 | 5/285 |
| 2,790,185 A * | 4/1957 | Fox | A47C 19/021 | 5/174 |
| 2,907,054 A * | 10/1959 | Sark | A47C 19/022 | 5/298 |
| 3,004,265 A * | 10/1961 | Brill | A47C 19/04 | 5/176.1 |
| 3,109,180 A * | 11/1963 | Hyman | A47C 19/005 | 5/296 |
| 3,188,664 A * | 6/1965 | Goldberg | F16B 12/52 | 5/282.1 |
| 3,230,555 A * | 1/1966 | Hooker | A47C 19/005 | 5/285 |
| 3,249,953 A * | 5/1966 | Leskin | A47C 19/005 | 5/285 |
| 3,503,389 A * | 3/1970 | McKee | 601/60 | |
| 3,680,156 A * | 8/1972 | McKee | A47C 19/021 | 5/238 |
| 3,740,776 A * | 6/1973 | Lazarus | A47C 19/022 | 5/296 |
| 3,760,437 A * | 9/1973 | Hooker | A47C 19/005 | 5/201 |
| 3,763,508 A * | 10/1973 | Feldman | A47C 19/022 | 5/131 |
| 3,842,451 A * | 10/1974 | McCormick | A47C 19/021 | 5/200.1 |
| 4,354,287 A * | 10/1982 | Fredman | A47C 19/005 | 5/185 |
| 4,559,657 A * | 12/1985 | Whitehead | A47C 19/021 | 403/10 |
| 4,802,248 A * | 2/1989 | Moroney | A47D 7/03 | 5/11 |
| 5,231,713 A * | 8/1993 | McDonnell | A47C 19/045 | 248/188 |
| 5,269,032 A * | 12/1993 | Flocks | A47C 19/022 | 5/280 |
| 5,502,852 A * | 4/1996 | Fredman | A47C 19/024 | 248/188.4 |
| 5,996,145 A * | 12/1999 | Taylor | A47C 19/005 | 5/184 |
| 6,611,977 B1 * | 9/2003 | Schuman | A47C 19/021 | 29/897 |
| 6,978,498 B2 * | 12/2005 | Gavela Vazquez | A47C 19/005 | 5/236.1 |
| 7,690,058 B1 * | 4/2010 | Dwyer | A47C 19/005 | 5/200.1 |
| 8,146,190 B1 * | 4/2012 | Wolfe | A47C 20/027 | 5/53.2 |
| 8,898,829 B1 * | 12/2014 | Bartlett | A47C 19/022 | 5/132 |
| 10,021,989 B2 * | 7/2018 | Goldsmith | A47C 19/005 | |
| 10,182,660 B2 * | 1/2019 | Lee | A47C 19/025 | |
| 10,342,358 B1 * | 7/2019 | Palashewski | A47C 27/082 | |
| 2001/0044961 A1 * | 11/2001 | Epstein | A47C 19/025 | 5/201 |
| 2006/0037135 A1 * | 2/2006 | Yang | A47C 19/022 | 5/53.1 |
| 2008/0078022 A1 * | 4/2008 | Wecker | A47C 19/021 | 5/1 |
| 2008/0184485 A1 * | 8/2008 | Shamie | A47D 7/01 | 5/2.1 |
| 2009/0113627 A1 * | 5/2009 | Harrow | A47C 19/005 | 5/200.1 |
| 2011/0271449 A1 * | 11/2011 | Ardis | A47C 21/044 | 5/423 |
| 2011/0309046 A1 * | 12/2011 | Lee | A47B 47/03 | 211/182 |
| 2012/0292278 A1 * | 11/2012 | Schluter | H05K 7/1421 | 211/183 |
| 2013/0291300 A1 * | 11/2013 | Bly | F16B 2/185 | 5/400 |
| 2014/0245534 A1 * | 9/2014 | Anderson | A47C 19/20 | 5/9.1 |
| 2016/0007759 A1 * | 1/2016 | Polevoy | A47C 19/024 | 5/400 |
| 2016/0206094 A1 * | 7/2016 | Fisher, III | A47B 91/024 | |
| 2017/0172307 A1 * | 6/2017 | Choi | A47C 19/024 | |
| 2017/0208954 A1 * | 7/2017 | Lee | A47C 19/025 | |
| 2018/0045235 A1 * | 2/2018 | Oh | F16B 12/54 | |
| 2018/0080489 A1 * | 3/2018 | Kil | A47B 47/00 | |
| 2019/0082854 A1 * | 3/2019 | Baden | A47C 19/04 | |

\* cited by examiner

BEDHEAD FRAME AND BED FRAME STRUCTURE HAVING THE BEDHEAD FRAME

BACKGROUND OF THE INVENTION

1. Field of the Invention

The present invention relates to a bed, and more particularly to a bedhead frame and a bed frame structure having the bedhead frame.

2. Description of the Prior Art

A bedhead frame is usually disposed at one side of a bed frame. Most of conventional bedhead frames are attached to the wall when used. The bedhead frame can be used as part of the bed frame. Both sides of the bedhead frame are connected to two support boards of the bed frame by means of connectors, or the bedhead frame is directly disposed at one side of the bed frame without a backrest, sold as a separate product. The conventional bed frame is an integrated plate-like structure. Because the width of the bedhead frame cannot be adjusted, it is difficult to pack and transport the bedhead frame. In addition, the conventional bed frames don't provide any retaining function for a mattress. The mattress may shift when mounted to the bed frame, causing trouble to the user.

Accordingly, the inventor of the present invention has devoted himself based on his many years of practical experiences to solve these problems.

SUMMARY OF THE INVENTION

The primary object of the present invention is to provide a bedhead frame and a bed frame structure having the bedhead frame, which can prevent a mattress from shifting and can be transported or stored conveniently.

According to one aspect of the present invention, a bedhead frame is provided. The bedhead frame comprises two vertical rods arranged symmetrically and at least one horizontal rod connected between the two vertical rods. Each of the vertical rods is an L-shaped structure having a horizontal side and an upright side. The horizontal sides of the two vertical rods are at the same level. The horizontal rod is connected to the horizontal sides of the two vertical rods.

Preferably, the horizontal side of each vertical rod is provided with a connecting portion extending from the horizontal side. Two ends of the horizontal rod are locked to the connecting portions of the two vertical rods, respectively.

According to another aspect of the present invention, a bed frame structure is provided. The bed frame structure comprises a bedhead frame, two side boards, a tail board, and a bed panel support frame. The bedhead frame comprises two vertical rods arranged symmetrically and at least one horizontal rod connected between the two vertical rods. Each of the vertical rods is an L-shaped structure having a horizontal side and an upright side. The horizontal sides of the two vertical rods are at the same level. The horizontal rod is connected between the horizontal sides of the two vertical rods. A first end of each of the two side boards is connected to the upright side of the bedhead frame. A second end of each of the two side boards is connected to the tail board. The bed plank support frame is located among the two side boards, the bedhead frame, and the tail board.

Preferably, the horizontal side and the upright side of each vertical rod of the bedhead frame are provided with connecting portions extending from the horizontal side and the upright side, respectively. Two ends of the horizontal rod are locked to the connecting portions of the horizontal sides of the two vertical rods, respectively. The first end of each of the two side boards is connected to the connecting portion of the upright side of a corresponding one of the vertical rods.

Preferably, the bed plank support frame includes a plurality of support rods and a connecting spine. One end of the connecting spine is connected to the horizontal rod of the bedhead frame. Another end of the connecting spine is connected to the tail board.

Preferably, the bed frame structure further comprises at least one oblique strut. One end of the oblique strut is connected to the upright side of a corresponding one of the vertical rods of the bedhead frame. Another end of the oblique strut is connected to a corresponding one of the side boards.

Preferably, the tail board and each of the two side boards are connected through a support leg. The support leg includes a support tube and two connecting members disposed at a top end of the support tube. The support tube is an L-shaped tube having a horizontal tube and an upright tube. The two connecting members are disposed at top ends of the horizontal tube and the upright tube of the support tube, respectively. One of the connecting members of the support leg is connected to a corresponding one of the side boards. The other of the connecting members is connected to the tail board.

Preferably, the support tube of the support leg has a quadrant cross-section.

Preferably, each of the connecting members of the support tube has a U-shaped longitudinal cross-section having an opening. The openings of the two connecting members simultaneously face inward or outward.

Preferably, the support tube of the support leg is a right-angled tube.

Preferably, each of the connecting members of the support tube has a U-shaped longitudinal cross-section having an opening, and the openings of the two connecting members simultaneously face inward or outward.

The horizontal rod and the vertical rods of the bedhead frame are detachable, so that the bedhead frame and the bed frame structure having the bedhead frame of the present invention can be transported or stored conveniently. In particular, the vertical rods of the bedhead frame employ an L-shaped structure having the horizontal side and the upright side. When a mattress is installed to the bed frame structure having the bedhead frame, both sides of the mattress are just between the upright sides and the horizontal sides of the two vertical rods, thereby preventing the mattress from shifting.

DETAILED DESCRIPTION OF THE PREFERRED EMBODIMENTS

Embodiments of the present invention will now be described, by way of example only, with reference to the accompanying drawings.

Figure 1:
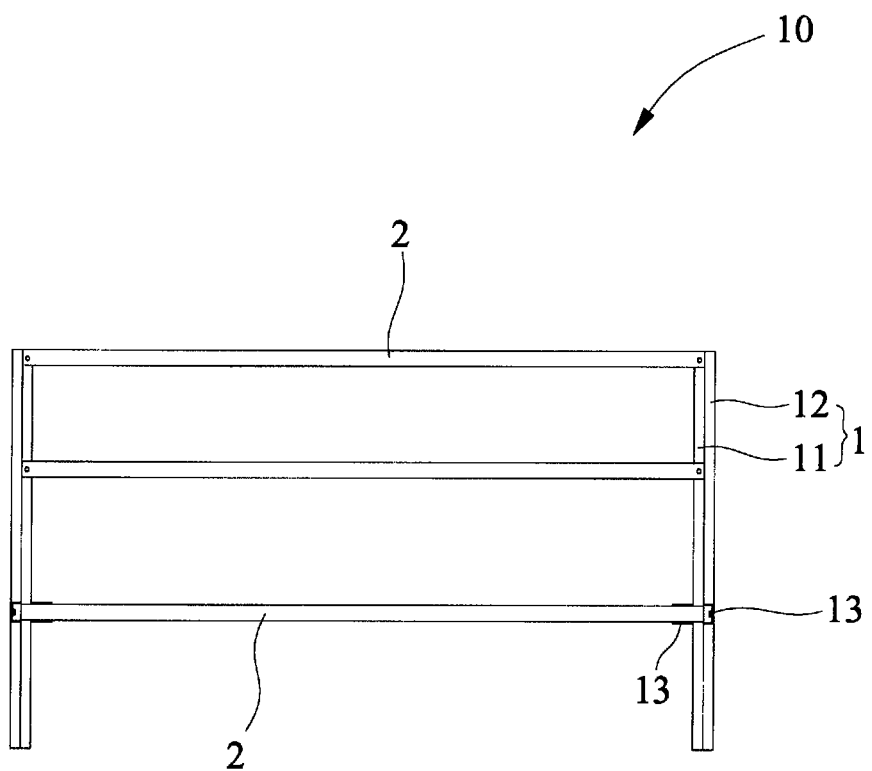
FIG. 1 is a schematic view of the bedhead frame of the present invention.
Figure 2:
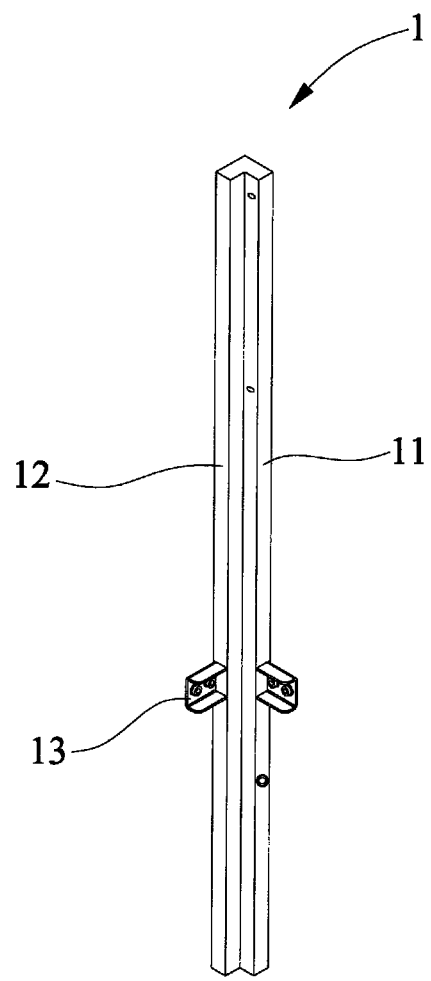
FIG. 2 is a schematic view of the vertical rod of the bedhead frame of the present invention.
Figure 3:
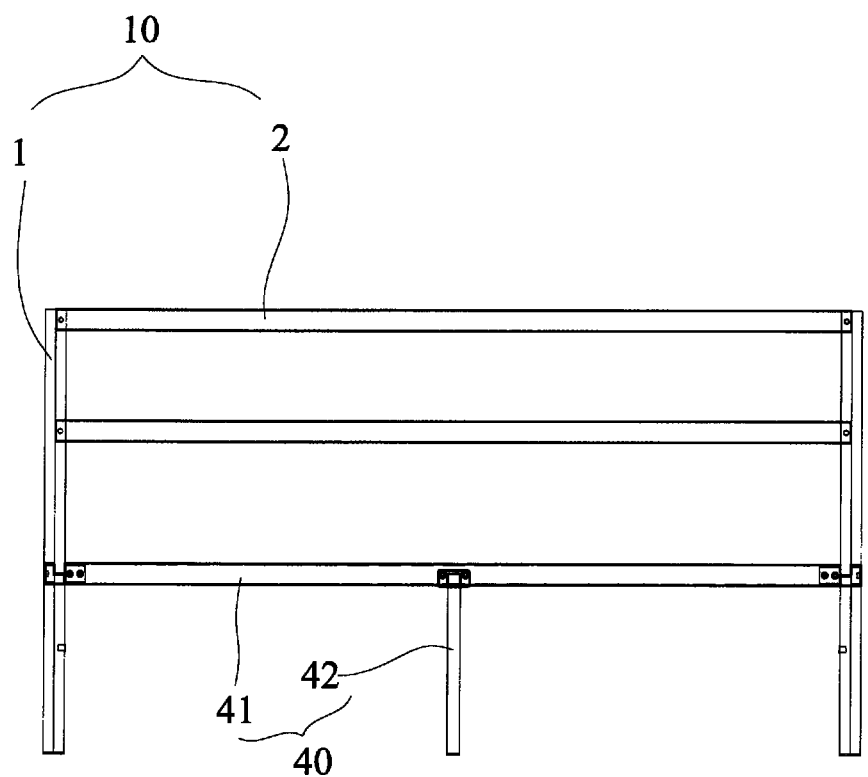
FIG. 3 is a front view of the bed frame of the present invention.
Figure 4:
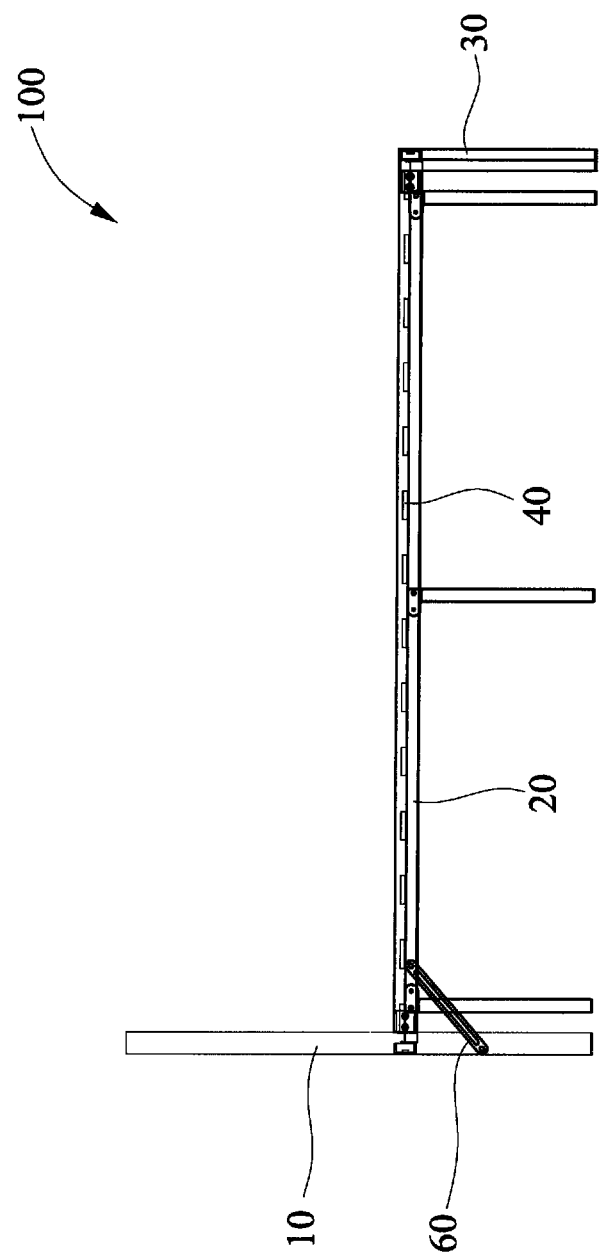
FIG. 4 is a side view of the bed frame of the present invention.
Figure 5:
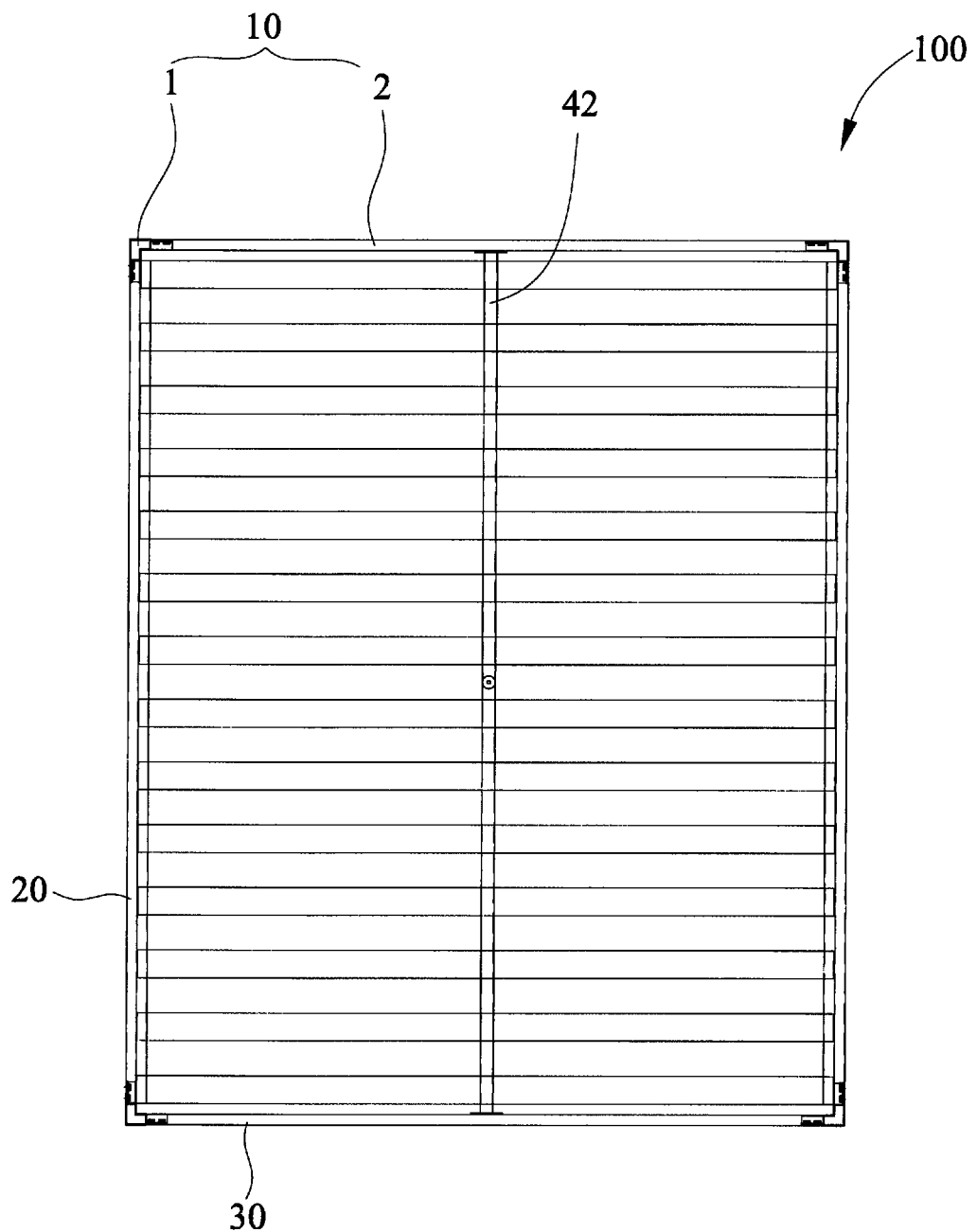
FIG. 5 is a top view of the bed frame of the present invention.

As shown in FIG. 1 and FIG. 2, the present invention discloses a bedhead frame 10. The bedhead frame 10 comprises two vertical rods 1 arranged symmetrically and at least one horizontal rod 2 connected between the two vertical rods 1. Each of the vertical rods 1 is an L-shaped structure having a horizontal side 11 and an upright side 12. The horizontal sides 11 of the two vertical rods 1 are at the same level. The horizontal side 11 of each vertical rod 1 is provided with a connecting portion 13 extending from the horizontal side 11. Two ends of the horizontal rod 2 are locked to the connecting portions 13 of the two vertical rods 1, respectively.

As shown in FIG. 3 to FIG. 6, the present invention discloses a bed frame structure 100. The bed frame structure 100 includes a bedhead frame 10, two side boards 20, a tail board 30, and a bed panel support frame 40. The bedhead frame 10 comprises two vertical rods 1 arranged symmetrically and at least one horizontal rod 2 connected between the two vertical rods 1. Each of the vertical rods 1 is an L-shaped structure having a horizontal side 11 and an upright side 12. The horizontal sides 11 of the two vertical rods 1 are at the same level. The horizontal rod 2 is connected between the horizontal sides 11 of the two vertical rods 1. A first end of each of the two side boards 20 is connected to the upright side 12 of the bedhead frame 10. A second end of each of the two side boards 20 is connected to the tail board 30. The bed plank support frame 40 is located among the two side boards 20, the bedhead frame 10, and the tail board 30.

The horizontal side 11 and the upright side 12 of each vertical rod 1 of the bedhead frame 10 are provided with connecting portions 13 extending from the horizontal side 11 and the upright side 12, respectively. Two ends of the horizontal rod 2 are locked to the connecting portions 13 of the horizontal sides 11 of the two vertical rods 1, respectively. The first end of each of the two side boards 20 is connected to the connecting portion 13 of the upright side 12 of a corresponding one of the vertical rods 1.

Figure 6:
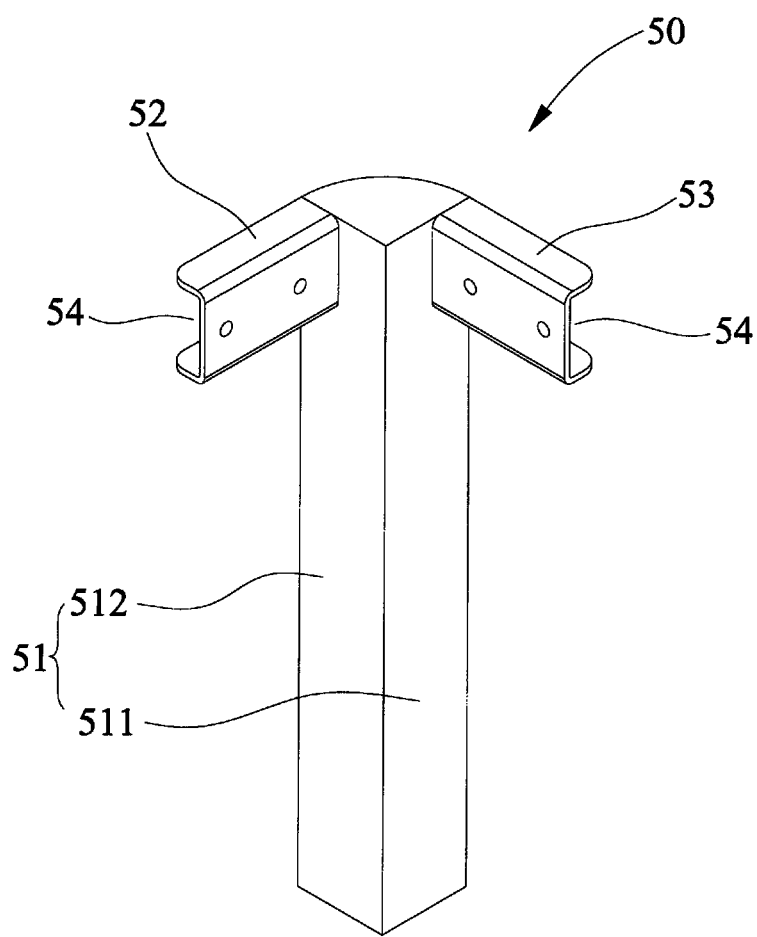
FIG. 6 is a schematic view of an embodiment of the support leg of the bed frame of the present invention.
Figure 7:
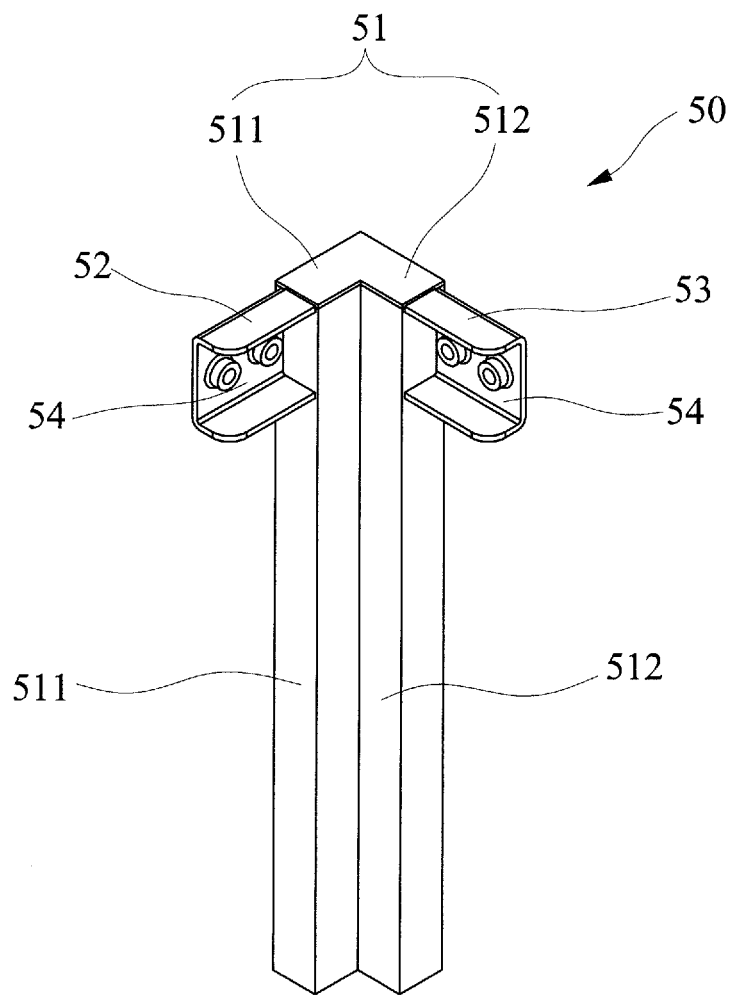
FIG. 7 is a schematic view of another embodiment of the support leg of the bed frame of the present invention.

As shown in FIG. 6 and FIG. 7, the tail board 30 and each of the two side boards 20 are connected through a support leg 50. The support leg 50 includes a support tube 51 and two connecting members 52, 53 disposed at the top end of the support tube 51. The support tube 51 is an L-shaped tube having a horizontal tube 511 and an upright tube 512. The two connecting members 52, 53 are located at the top ends of the horizontal tube 511 and the upright tube 512 of the support tube 51, respectively. One of the connecting members 52, 53 of the support leg 50 is connected to a corresponding one of the side boards 20, and the other of the connecting members 52, 53 is connected to the tail board 30.

FIG. 6 illustrates an embodiment of the support leg 50. The support tube 51 of the support leg 50 has a quadrant cross-section. The horizontal tube 511 and the upright tube 512 of the support leg 50 are integrally formed. The longitudinal cross-section of each of the connecting members 52, 53 is in a "U" shape having an opening 54. The two connecting members 52, 53 are located at the top ends of the horizontal tube 511 and the upright tube 512 of the support tube 51, respectively. Both the openings 54 of the two connecting members 52, 53 may simultaneously face inward or outward. The two connecting members 52, 53 are configured to connect the side boards 20 with the tail board 30. This arrangement that both the openings 54 of the two connecting members 52, 53 simultaneously face inward or outward allows the two support legs 50 to be arbitrarily fitted. It is convenient for installation.

FIG. 7 illustrates another embodiment of the support leg 50. The support tube 51 of the support leg 50 is a right-angled tube. The horizontal tube 511 and the upright tube 512 of the support leg 50 are integrally formed. The longitudinal cross-section of each of the connecting members 52, 53 is in a "U" shape having an opening 54. The two connecting members 52, 53 are located at the top ends of the horizontal tube 511 and the upright tube 512 of the support tube 51, respectively. Both the openings 54 of the two connecting members 52, 53 may simultaneously face inward or outward. The bed plank support frame 40 includes a plurality of support rods 41 and a connecting spine 42. One end of the connecting spine 42 is connected to the horizontal rod 2 of the bedhead frame 10. Another end of the connecting spine 42 is connected to the tail board 30. Each support rod 41 is connected between the corresponding side board 20 and the connecting spine 42. Each support rod 41 may be directly connected between the two side boards 20, and the connecting spine 42 is disposed at the bottom of each support rod 41 for supporting the support rod 41.

The bed frame structure 100 may include at least one oblique strut 60 for reinforcing the bed frame structure. One end of the oblique strut 60 is connected to the upright side 12 of a corresponding one of the vertical rods 1 of the bedhead frame 10. Another end of the oblique strut 60 is connected to a corresponding one of the side boards 20.

The horizontal rod 2 and the vertical rods 1 of the bedhead frame 10 are detachable, so that the bedhead frame 10 and the bed frame structure 100 having the bedhead frame of the present invention can be transported or stored conveniently. In particular, the vertical rods 1 of the bedhead frame 10 employ an L-shaped structure having the horizontal side 11 and the upright side 12. When a mattress is installed to the bed frame structure 100 having the bedhead frame 10, both sides of the mattress are just between the upright sides 12 and the horizontal sides 11 of the two vertical rods 1, thereby preventing the mattress from shifting.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bedhead frame, comprising two vertical rods arranged symmetrically and at least one horizontal rod connected between the two vertical rods, each of the vertical rods being an L-shaped structure having a horizontal side and an upright side, the horizontal sides of the two vertical rods being at the same level, the horizontal rod being connected to the horizontal sides of the two vertical rods;

wherein the L-shaped structure of each of the vertical rods comprises a first limb and a second limb each of which has a side surface, the side surfaces of the first and second limbs being perpendicular to each other, the first limb and the second limb respectively forming the horizontal side and the upright side of the vertical rod, wherein the first limb has an end surface that is distant from and separated from the second limb by the side surface of the first limb, and the end surfaces of the first limbs of the two vertical rods face each other and are opposite to each other, the horizontal rod having two ends that are respectively connected to the end surfaces of the first limbs of the two vertical sides in a detachable manner and the ends of the horizontal rod are attached to the end surfaces of the first limbs and are spaced from the second limbs by the side surfaces of the first limbs, such that the horizontal rod extends between the end surfaces of the first limbs and is spaced from the second limbs.

2. The bedhead frame as claimed in claim 1, wherein the horizontal side of each vertical rod is provided with a connecting portion extending from the horizontal side, and two ends of the horizontal rod are locked to the connecting portions of the two vertical rods, respectively.

3. A bed frame structure, comprising a bedhead frame, two side boards, a tail board, and a bed panel support frame, the bedhead frame comprising two vertical rods arranged symmetrically and at least one horizontal rod connected between the two vertical rods, each of the vertical rods being an L-shaped structure having a horizontal side and an upright side, the horizontal sides of the two vertical rods being at the same level, the horizontal rod being connected between the horizontal sides of the two vertical rods, a first end of each of the two side boards being connected to the upright side of the bedhead frame, a second end of each of the two side boards being connected to the tail board, the bed plank support frame being located among the two side boards, the bedhead frame, and the tail board, wherein the L-shaped structure of each of the vertical rods comprises a first limb and a second limb each of which has a side surface, the side surfaces of the first and second limbs being perpendicular to each other, the first limb and the second limb respectively forming the horizontal side and the upright side of the vertical rod, wherein the first limb has an end surface that extends in a direction different from the side surface and the end surface of the first limb is distant from and separated from the second limb by the side surface of the first limb, and the end surfaces of the first limbs of the two vertical rods face each other and are opposite to each other, the horizontal rod having two ends that are respectively connected to the end surfaces of the first limbs of the two vertical sides in a detachable manner and the ends of the horizontal rod are attached to the end surfaces of the first limbs and are spaced from the second limbs by the side surfaces of the first limbs, such that the horizontal rod extends between the end surfaces of the first limbs and is spaced from the second limbs.

4. The bed frame structure as claimed in claim 3, wherein the horizontal side and the upright side of each vertical rod of the bedhead frame are provided with connecting portions extending from the horizontal side and the upright side respectively, two ends of the horizontal rod are locked to the connecting portions of the horizontal sides of the two vertical rods respectively, and the first end of each of the two side boards is connected to the connecting portion of the upright side of a corresponding one of the vertical rods.

5. The bed frame structure as claimed in claim 3, wherein the bed plank support frame includes a plurality of support rods and a connecting spine, one end of the connecting spine is connected to the horizontal rod of the bedhead frame, and another end of the connecting spine is connected to the tail board.

6. The bed frame structure as claimed in claim 3, wherein further comprising at least one oblique strut, one end of the oblique strut being connected to the upright side of a corresponding one of the vertical rods of the bedhead frame, another end of the oblique strut being connected to a corresponding one of the side boards.

7. The bed frame structure as claimed in claim 3, wherein the tail board and each of the two side boards are connected through a support leg, the support leg includes a support tube and two connecting members disposed at a top end of the support tube, the support tube is an L-shaped tube having a horizontal tube and an upright tube, the two connecting members are disposed at top ends of the horizontal tube and the upright tube of the support tube respectively, one of the connecting members of the support leg is connected to a corresponding one of the side boards, the other of the connecting members is connected to the tail board.

8. The bed frame structure as claimed in claim 7, wherein the support tube of the support leg has a quadrant cross-section.

9. The bed frame structure as claimed in claim 8, wherein each of the connecting members of the support tube has a U-shaped longitudinal cross-section having an opening, and the openings of the two connecting members simultaneously face inward or outward.

10. The bed frame structure as claimed in claim 7, wherein the support tube of the support leg is a right-angled tube.

11. The bed frame structure as claimed in claim 10, wherein each of the connecting members of the support tube has a U-shaped longitudinal cross-section having an opening, and the openings of the two connecting members simultaneously face inward or outward.

* * * * *